United States Patent [19]
Noritake et al.

[11] Patent Number: 5,992,924
[45] Date of Patent: Nov. 30, 1999

[54] IMPACT ENERGY ABSORBING STRUCTURE OF VEHICLE BODY UPPER PORTION OF AN AUTOMOBILE

[75] Inventors: Yoshinori Noritake, Toyota; Masamichi Aono, Aichi-ken; Takuji Shimoda, Toyota, all of Japan

[73] Assignee: Toyota Jidosha Kabushiki Kaisha, Toyota, Japan

[21] Appl. No.: 08/835,716

[22] Filed: Apr. 10, 1997

[30]  Foreign Application Priority Data

| Apr. 10, 1996 | [JP] | Japan | 8-112174 |
| Jul. 25, 1996 | [JP] | Japan | 8-213319 |
| Aug. 26, 1996 | [JP] | Japan | 8-241008 |

[51] Int. Cl.⁶ .................................................. B60R 21/04
[52] U.S. Cl. .......................................... 296/189; 280/751
[58] Field of Search ................................... 296/189, 188, 296/39.1, 203; 280/748, 752, 751

[56]  References Cited

U.S. PATENT DOCUMENTS

| 4,786,540 | 11/1988 | Bruhnke et al. . | |
| 5,163,730 | 11/1992 | Welch . | |
| 5,544,933 | 8/1996 | Shahab et al. | 296/189 |
| 5,575,500 | 11/1996 | Mimura et al. | 296/189 X |
| 5,609,385 | 3/1997 | Daniel et al. | 296/188 |
| 5,660,426 | 8/1997 | Sugimori et al. | 296/189 |

FOREIGN PATENT DOCUMENTS

| 0 676 315 | 10/1995 | European Pat. Off. . |
| 0 691 259 | 1/1996 | European Pat. Off. . |
| 3740687 C2 | 9/1988 | Germany . |
| 5-065695 | 8/1993 | Japan . |
| 6-211088 | 8/1994 | Japan . |

*Primary Examiner*—Joseph D. Pape
*Attorney, Agent, or Firm*—Pillsbury Madison & Sutro LLP

[57]  ABSTRACT

An impact energy absorbing structure includes a front pillar (30) including flange joint portions (44, 45) where flanges respectively of an outer panel (38) and an inner panel (40) are overlapped and joined, a pillar garnish (32) disposed with a space (d) from the front pillar, an energy absorber (34) disposed in the space, and a plurality of abutting ribs (36). The abutting rib is formed so as to bump against the flange joint portion (44) when the pillar garnish deforms outwardly.

4 Claims, 8 Drawing Sheets

IMPACT ENERGY ABSORBING STRUCTURE OF VEHICLE BODY UPPER PORTION OF AN AUTOMOBILE

BACKGROUND OF THE INVENTION

1. Field of the Invention

This invention relates to an impact energy absorbing structure of vehicle body upper portion of an automobile, and in more particular, to a structure for absorbing an impact energy caused by a structural member such as a front pillar, a center pillar, a rear pillar, or a roofside rail by an interior trim material disposed with a space from the structural member inwardly of a passenger compartment and an energy absorbing material disposed in the space.

2. Description of the Related Art

There has been proposed a vehicle upper structure (Japanese Patent Appln. Public Disclosure No. 6-211088) comprising a pillar of a vehicle, a pillar garnish disposed with a predetermined space inwardly of a passenger compartment, and an energy absorber disposed in the space. In the impact energy absorbing structures, when impact force directed from the inward to the outward of the passenger compartment is exerted, the interior trim material is deformed, and with the deformation the energy absorber is deformed to absorb impact energy.

There is a fear that, depending on the direction of the impact force exerted on the interior trim material, the interior trim material slides against the energy absorber, the interior trim material slides together with the energy absorber against the inner panel or the interior trim material is opened, causing to be out of an energy absorbing characteristic.

The above-mentioned problem is concretely explained in the following, for example, with reference to a pillar of an automobile. An automobile pillar is generally formed to present a closed structure in its horizontal section by joining flanges respectively of an inner panel and an outer panel, and the rigidity of the flange joint portion is particularly made great. As one of countermeasures against an impact due to a load directed toward the flange joint portion, the energy absorbing structure shown in FIG. 11 can be considered. The countermeasure is intended that, when an impact receiving body 20 is subjected to a load in the direction A, in order to ensure a space S sufficient not to bring the impact receiving body 20 with a flange joint portion 22 of a pillar 21, a side portion 24 of a pillar garnish 23 is bent in its horizontal section to project inwardly and to dispose an energy absorber 25 between the pillar 21 and the pillar garnish 23. A terminal portion 26 of the side portion of the pillar garnish becomes approximately parallel to the direction A of the load, and is positioned with a gap 28 from an inner panel 27 of the pillar 21.

Suppose the impact receiving body 20 is subject to a load in the direction A, the impact receiving body 20 firstly gets into contact with the protruded portion 29 of the side portion 24 of the pillar garnish 23, and thereafter moves toward the pillar 21. During the movement, the side portion 24 of the pillar garnish 23 moves substantially in the same direction as the direction A of the load. As shown in FIG. 12, when the gap 28 is gone, and the end face of the terminal portion 26 of the side portion 24 of the pillar garnish 23 is brought into contact with the inner panel 27, the terminal portion 26 stands firm so as to maintain its configuration, so that the load rises like $C_1$ in FIG. 10. The terminal portion 26 as well as the protruded portion 29 of the side portion 24 are rather stronger than other portions of the pillar garnish 23. However, with an increase in load, those portions 26, 29 are deformed so as to have the load shifted to a weaker portion of the pillar garnish 23, so that the load is shifted to another weaker portion when it exceeds a load limit, simultaneously moving the energy absorber 25 in the direction B. As a result, the load decreases like $C_2$ in FIG. 10. And when the energy absorber 25 gets into the state shown by an imaginary line in FIG. 12, an energy absorbing function is lost, so that the impact receiving body 20 gets into contact with the flange joint portion 22 and the load rapidly rises like $C_3$ in FIG. 10. The amount of energy absorption in this case is given by an area defined under $C_1$, $C_2$, $C_3$ in FIG. 10, but it can be said that the area is smaller for the difference in load, and that in an energy absorbing structure as shown in FIG. 11 an efficient energy absorption cannot be attained.

SUMMARY OF THE INVENTION

The present invention provides an impact energy absorbing structure of vehicle body upper portion of an automobile capable of obtaining a preset energy absorbing characteristic even if impact force is exerted to an interior trim material from any direction.

The present invention further provides an impact energy absorbing structure of vehicle body upper portion capable of efficiently absorbing energy in an automobile with a sufficient space ensured between an impact receiving body and a flange joint portion of a pillar.

The present invention relates to an impact energy absorbing structure of vehicle body upper portion of an automobile comprising a structural member having two flange joint portions where two flanges each of an outer panel and an inner panel are overlapped and joined and formed as a closed sectional structure, an interior trim material disposed with a space necessary for absorbing energy inwardly from the structural member, and an energy absorber disposed in the space. This impact energy absorbing structure has means for surely deforming the energy absorber when the interior trim material deforms outwardly of the compartment.

The deforming means can be provided in the interior trim material or the energy absorber. Furthermore, it can be provided in both the interior trim material and the energy absorber, and can be made as part separately formed from the interior trim material and the energy absorber. The deforming means, when provided in the interior trim material, is at least one abutting rib projecting outwardly from an outer side face of the interior trim material. This abutting rib is formed so as to abut against one of the two flange joint portions. In case the means is provided in the energy absorber, the energy absorber is a resin-made lattice-like rib having at least one longitudinal rib extending in the longitudinal direction of the structural member and a plurality of lateral ribs intersecting the longitudinal rib. The longitudinal rib extends toward the base of one of the two flange joint portions. In case the means is provided in both the interior trim material and the energy absorber, the side portion of the interior trim material has a plurality of notches, while the energy absorber has an additional portion passing the notches and extending toward one flange joint portion. In case the means is the separate part, this part is at least one clamp coupling the one flange joint portion and the interior trim material. The clamp can also couple the one flange joint portion and the energy absorber.

When an impact directed from the inward to the outward of the passenger compartment is applied to deform the interior trim material outwardly, the means constrains at least on of the interior trim material and the energy absorber.

As a result, a sure deformation of the energy absorber enables effective absorption of impact energy. It also exhibits the energy absorbing characteristic as designed.

DESCRIPTION OF THE PREFERRED EMBODIMENTS

Figure 1:
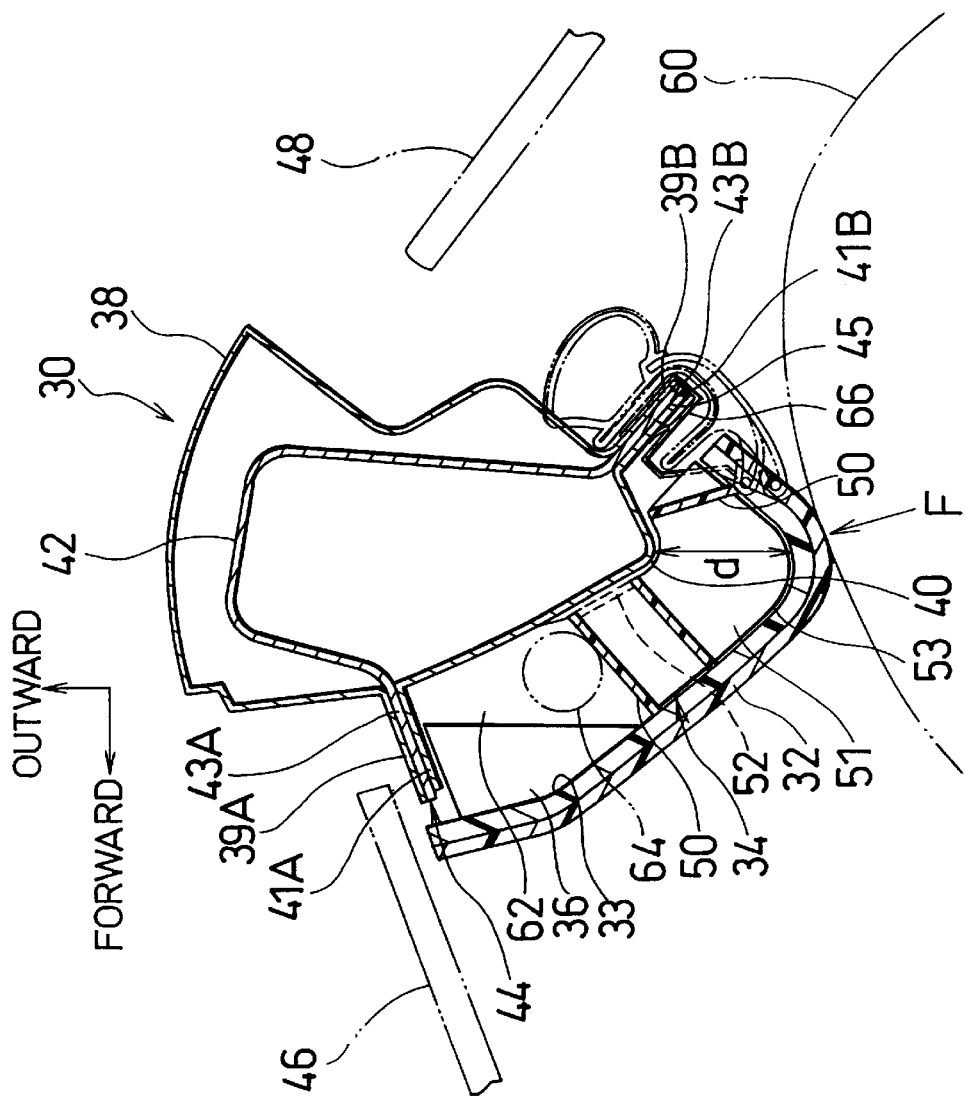
FIG. 1 is a sectional view cut at a horizontal imaginary plane of an embodiment of the impact energy absorbing structure of the vehicle body upper portion of an automobile relative to the present invention.
Figure 2:
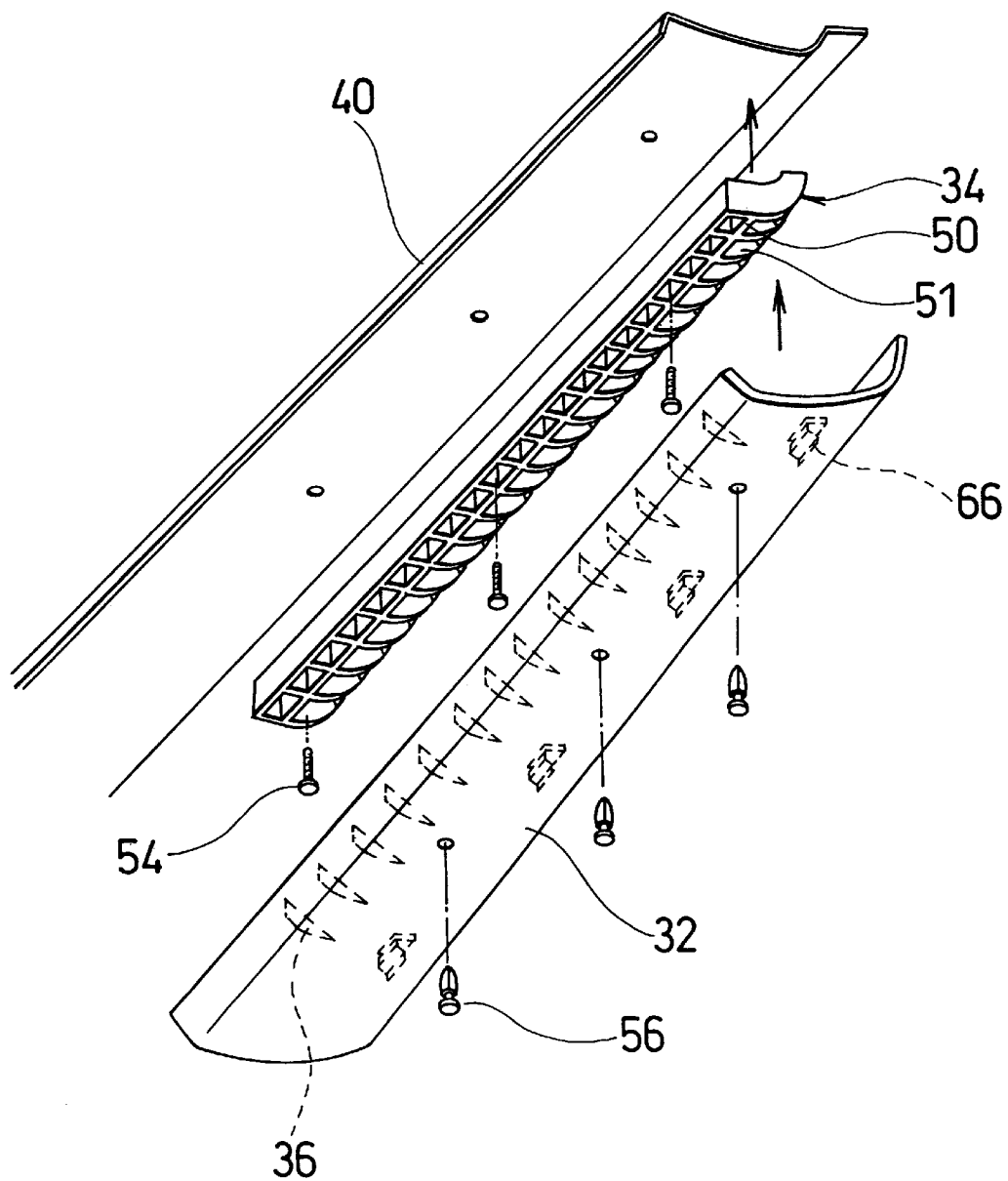
FIG. 2 is an exploded perspective view of an embodiment of the impact energy absorbing structure of vehicle body upper portion of an automobile relative to the present invention.

An impact energy absorbing structure absorbs impact energy in a vehicle upper portion of an automobile comprising, with reference to FIG. 1 showing a sectional state and FIG. 2 showing an exploded perspective state, a structural member 30, an interior trim material 32, and an energy absorber 34, wherein an abutting rib 36 is included.

The structural member 30 is a front pillar of an automobile in the illustrated embodiment. The structural member 30 includes two flange joint portions 44, 45 where mutually opposing two flanges 39A, 39B of an outer panel 38, two flanges 41A, 41B of an inner panel 40, and two flanges 43A, 43B of a reinforcing panel 42 are overlapped and joined by spot-welding, and a section cut at a horizontal imaginary plane is formed as a closed structure. A windshield glass 46 and a door glass 48 are disposed in the vicinity of the structural member 30.

The interior trim material 32 is a pillar garnish and is disposed with a space d necessary for energy absorption from the inner panel 40 of the structural member 30 inwardly thereof. The size of the space d is different depending on its location, but can be set within a range of 10–30 mm.

In the illustrated embodiment, the energy absorber 34 is a lattice-like rib made of a hard resin such as polyethylene including three rows of longitudinal ribs 50 extending in the longitudinal direction of the interior trim material 32, and a considerable number of lateral ribs 51 extending in the direction intersecting these longitudinal ribs 50. The pitch between the ribs can be set at 15–35 mm, and the thickness of the ribs can be set at 1–2 mm. The energy absorber 34 has a mounting seat 52 near the inner panel 40 and a mounting seat 53 near the interior trim material 32 at required positions. The energy absorber 34 is attached to the inner panel 40 by passing a screw 54 through the mounting seat 52 of the energy absorber 34 disposed within the space d and screwing the screw into the inner panel 40. On the other hand, the interior trim material 32 is attached to the energy absorber 34 by inserting a clip 56 extending through the interior trim material 32 into the mounting seat 53 of the energy absorber 34.

A plurality of abutting ribs 36 are projected from the outer side face 33 of the interior trim material 32 outwardly at the front side portion of the interior trim material 32. It is preferable to displace the plurality of abutting ribs 36, as shown in FIG. 2, with the spaces in the longitudinal direction of the interior trim material 32, but at least one abutting rib 36 may be provided. The abutting rib 36 is integrally molded with the pillar garnish. In case a plurality of abutting ribs 36 are provided, they can be arranged at a pitch of 20–40 mm, and the thickness of the abutting rib 36 can be set at 1–3 mm. In the embodiment shown in FIG. 1, the abutting rib 36 is formed such that its plane configuration presents substantially a triangular shape. The abutting rib 36 bumps against the flange joint portion 44 ahead of the structural member 30 when, for example, an impact receiving body 60 such as a passenger's head bumps against the interior trim material and the interior trim material 32 deforms outwardly due to the impact force F.

In the embodiment shown in FIG. 1, a space 62 extending in the vertical direction, which is the longitudinal direction of the interior trim material 32, is formed between the plural abutting ribs 36 and the lattice-like rib 34 which is an energy absorber. A wire harness 64 can be disposed in this space 62, and the wire harness 64 can be held by the abutting ribs 36 by using a proper clamp.

Figure 3:
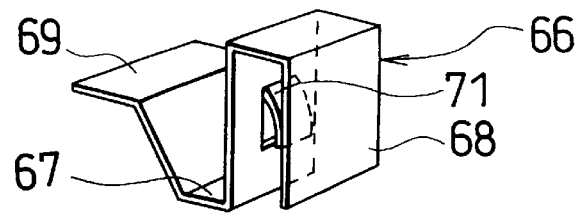
FIG. 3 is a perspective view of an embodiment of a clip used for the impact energy absorbing structure of vehicle body upper portion of an automobile relative to the present invention.

In the embodiment shown in FIGS. 1 and 2, a plurality of clamps 66 couple a flange joint portion 45 behind the structural member 30 and a part of the interior trim material 32 opposing the flange joint portion 45. It is effective to use only one clamp 66. As shown in FIG. 3, the clamp 66 has a U-shaped bend portion 68, a flat portion 69, and a connecting portion 70 for connecting the bend portion 68 and the flat portion 69, and is made by press-molding a thin steel plate. The bend portion 68 has a raise 71. By fitting the bend portion 68 into the flange joint portion 45 and closely contacting the raise 71 to the flange joint portion 45, the flat portion 69 is adhered or secured by welding to the interior trim material 32. It is possible to secure the flat portion 69 to the energy absorber 34.

While in FIG. 1 the abutting rib 36 and the clamp 66 are described for convenience' sake, at least one of the abutting rib 36 and the clamp 66 needs to be provided. In case both the abutting rib 36 and the clamp 66 are provided, the clamp 66 is attached at a pitch double or three times the pitch of the rib 36.

Figure 4:
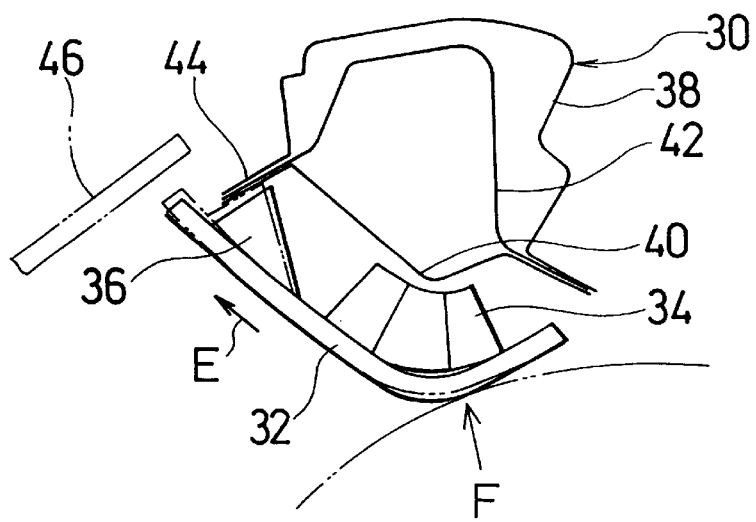
FIG. 4 is a diagram showing a function of the impact energy absorbing structure of vehicle body upper portion of an automobile relative to the present invention in case an abutting rib is provided.

As shown in FIG. 4, when impact force F is applied to the interior trim material 32 including the abutting rib 36, the interior trim material 32 deforms outwardly of the passenger compartment, simultaneously sliding toward the windshield glass 46 like E. This is caused by a clearance of an inserting hole of the clip 56 or a breakage in the peripheral portion of the inserting hole, even if the interior trim material 32 is attached to the energy absorber 34 by the clip 56. If the interior trim material 32 slides and the abutting rib 36 bumps against the flange joint portion 44, the interior trim material 32 cannot slide farther. As a result, the impact force F is applied to the energy absorber 34, causing the longitudinal rib 50 and the lateral ribs 51 to buckle or shear, thereby absorbing the impact energy.

Figure 5:
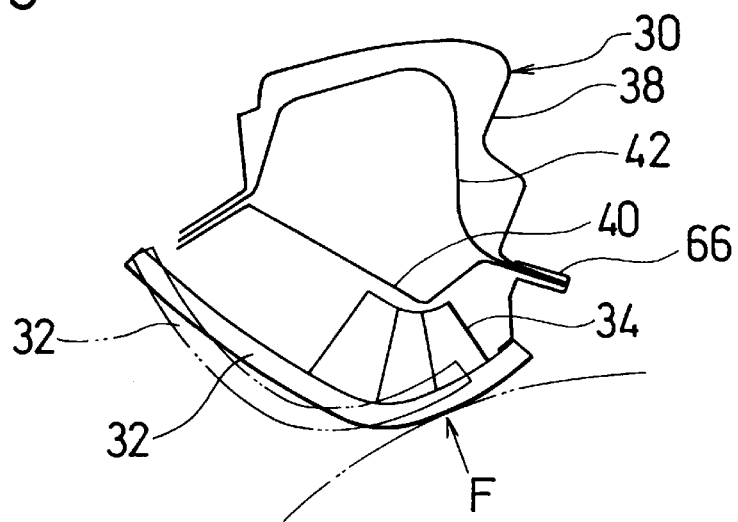
FIG. 5 is a diagram showing a function of the impact energy absorbing structure of vehicle body upper portion of an automobile relative to the present invention in case a clip is provided.

As shown in FIG. 5, when the impact force F is applied to the interior trim material 32 including the clamp 66, the deformation of the interior trim material which would have been like the imaginary line without the presence of the clamp 66 is hindered by the presence of the clamp 66. Consequently, the impact force F is applied to the energy absorber 34, causing the longitudinal rib 50 and the lateral ribs 51 of the energy absorber 34 to buckle or shear to absorb the impact energy.

According to the embodiment shown in FIGS. 1 through 5, it is possible to prevent the interior trim material, when the impact force is applied, from sliding or getting opened by constraining the interior trim material with the abutting rib or the clamp. As a result, the energy absorber can be surely deformed.

Figure 6:
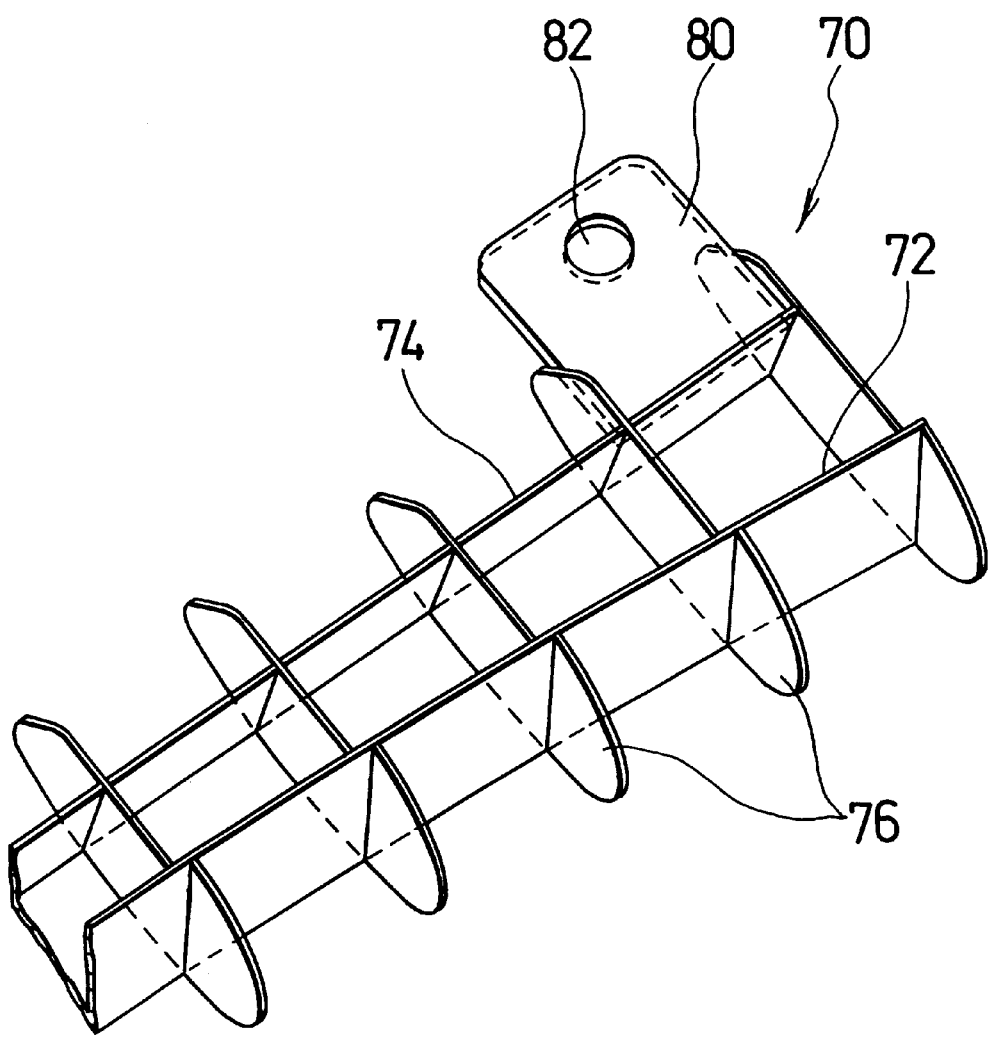
FIG. 6 is a perspective view showing a part, as viewed from the back side of the energy absorber used for the impact energy absorbing structure of vehicle body upper portion of an automobile relative to the present invention.
Figure 7A:
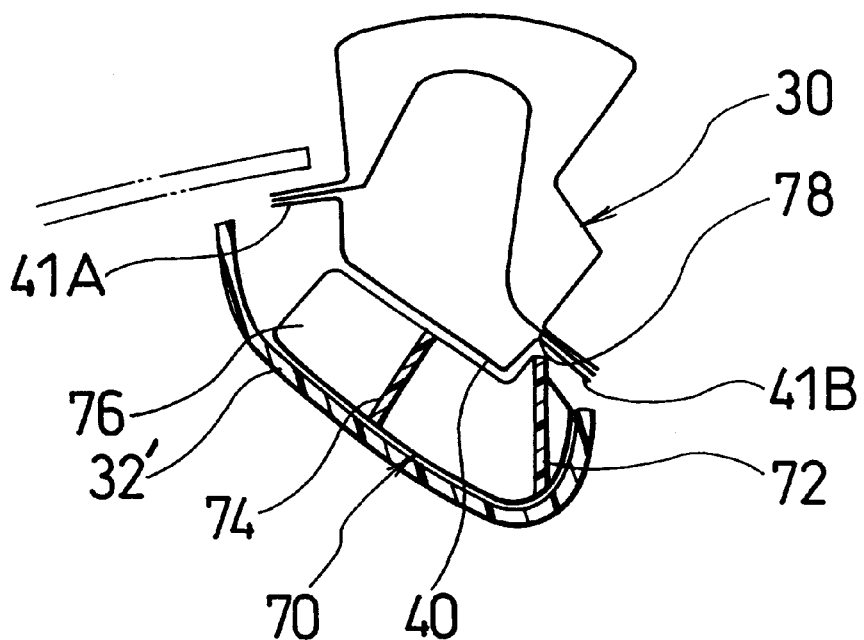
FIGS. 7a and 7b are a sectional views cut at a horizontal imaginary plane of another embodiment of the impact energy absorbing structure of vehicle body upper portion of an automobile relative to the present invention in which the energy absorber shown in FIG. 6 is used, of which 7a shows a state before deformation and 7b shows a state after deformation.
Figure 7B:
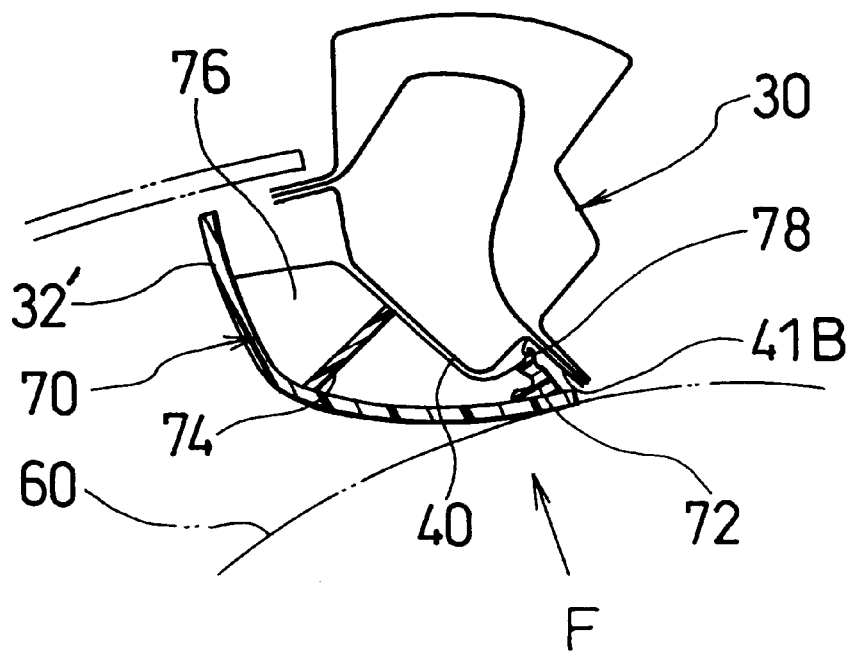

With reference to FIG. 6 showing a perspective state viewed from the rear side and FIGS. 7a and 7b showing a sectional state, an energy absorber 70 is a resin-made lattice-like rib including two rows of longitudinal ribs 72, 74 and a considerable number of lateral ribs 76 intersecting the longitudinal ribs 72, 74. In this embodiment, the structural member 30 is substantially the same as in the aforementioned embodiment, and the interior trim material 32' is substantially the same as the interior trim material 32 of the aforementioned embodiment except that it does not have an abutting rib.

The longitudinal ribs 72, 74 extend in the longitudinal direction of the interior trim material 32, that is, in the longitudinal direction of the structural member, wherein one longitudinal rib 72 extends toward the bottom or base 78 of one flange 41B of two flanges 41A, 41B of the inner panel 40 in a horizontal imaginary plane, i.e., in the sheet surface of FIGS. 7a, 7b. In other words, in the aforementioned imaginary plane, the longitudinal rib 72 is longer than the longitudinal rib 74 and formed, so to speak, in an extended configuration, with the extended portion reaching a corner of the flange 41B and the front end being positioned in the vicinity of the base 78. The gap between the longitudinal rib 72 and the base 78 of the flange can be set at 2–5 mm. The configuration of the longitudinal rib 72 is substantially the same over the whole length in the longitudinal direction of the energy absorber 70, and the lengths in the longitudinal direction of the two rows of the longitudinal ribs 72, 74 are substantially equal to each other. The energy absorber 70 includes a plurality (one is shown in FIG. 6) of mounting seats 80, and can be mounted on the structural member 30 by screwing a bolt 54 (FIG. 2) passed through a hole 82 of the mounting seat 80 into the inner panel.

Depending on the shape of the energy absorber 70 in an imaginary plane, a lattice-like rib can be formed by the longitudinal rib 72 and a plurality of lateral ribs 76. Also, it is possible to extend the longitudinal rib toward the base of the other flange 41A of the two flanges 41A, 41B of the inner panel 40, or to extend the two longitudinal ribs toward the bases of the two flanges 41A, 41B.

Figure 10:
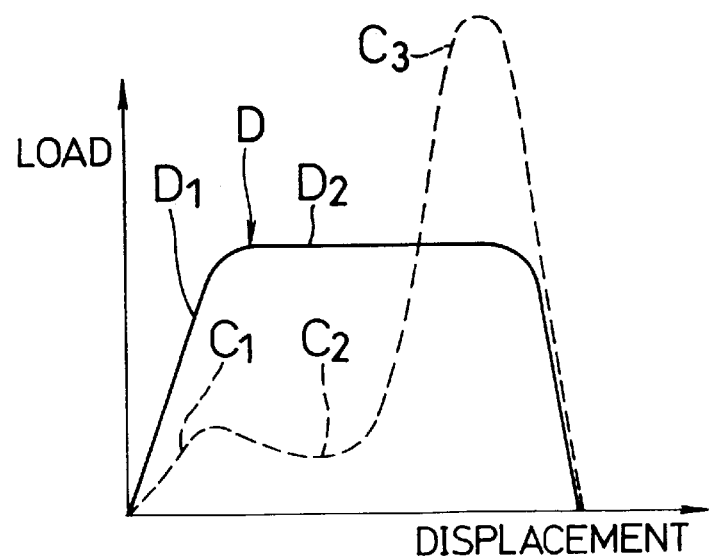
FIG. 10 is a characteristic curve of loads and displacements of the energy absorber.
Figure 11:
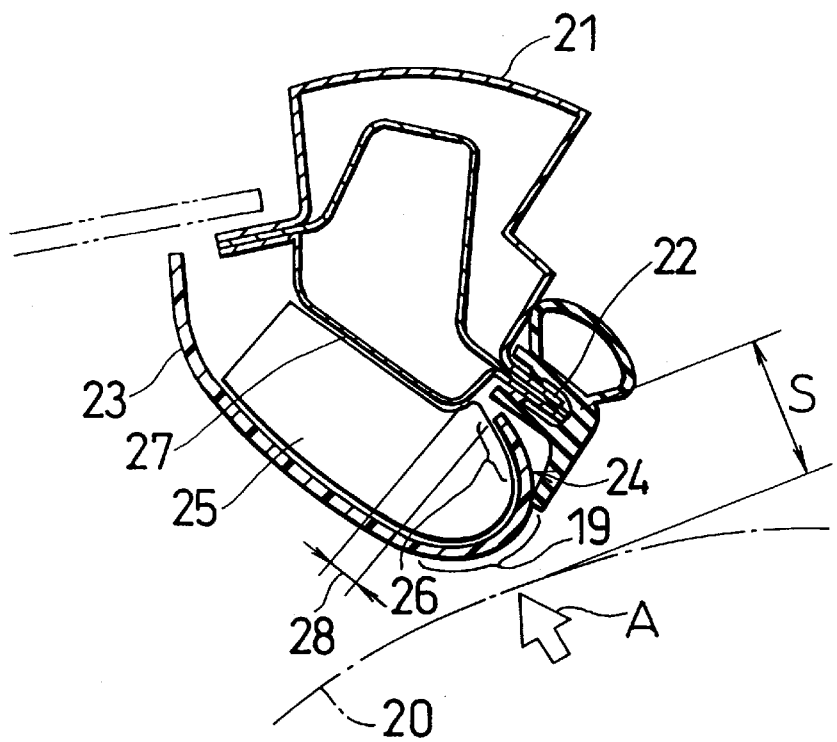
FIG. 11 is a horizontal sectional view showing the impact energy absorbing structure of vehicle body upper portion considered to be capable of avoiding an impact due to the flange joint portion, and showing a state before deformation.
Figure 12:
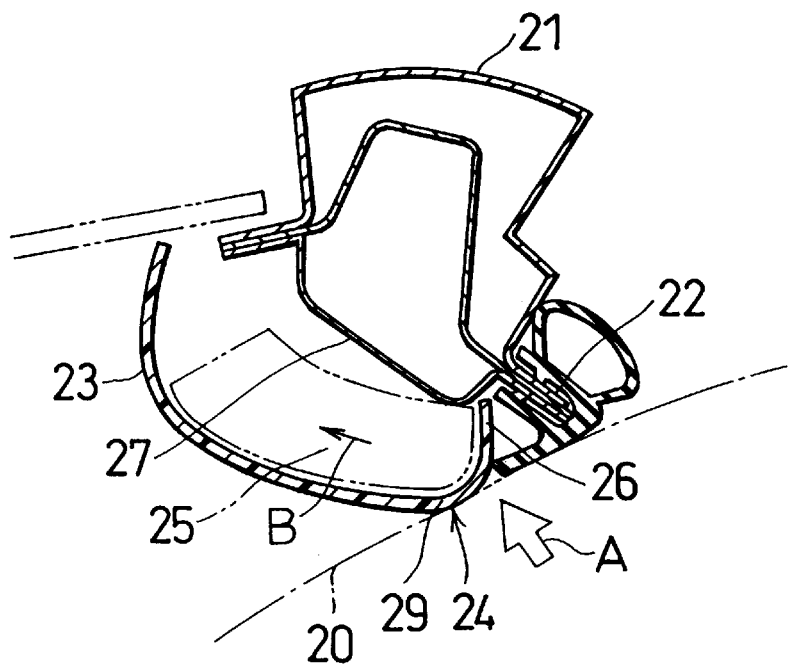
FIG. 12 is a horizontal sectional view showing the impact energy absorbing structure of vehicle body upper portion considered to be capable of avoiding an impact due to the flange joint portion, and showing a state after deformation.

The energy absorber 70 functions as follows. When impact force F directed from the impact receiving body 60 outwardly is applied via the interior trim material 32, the longitudinal rib 72 bumps against the base 78 of the flange 41B of the innter panel 40 and constrains the energy absorber 70. At this time, the attitude and the position of the interior trim material 32 is maintained substantially in the same state as before the impact force is applied, and the energy absorber 70 of the lattice-like rib is deformed substantially at the same position as before the impact force is applied. The longitudinal rib 72 which bumped against the base 78 of the flange 41 due to the impact force begins, starting to buckle to directly absorb the impact force and propagates the impact force over the entire lattice-like rib, thereby absorbing energy from the start when the impact force is applied. As a result, the energy absorption characteristic D in load displacement becomes $D_1$, $D_2$ in which the rising $D_1$ is rapid as shown in FIG. 10, approaching an idealistic rectangular energy absorption characteristic.

According to the aforementioned embodiments, the following effects are obtained:

In case the structural member is a front pillar, the pillar garnish which is an interior trim material disposed inwardly of the front pillar is prevented from sliding or opening, surely deforming the energy absorber to effectively absorb the impact energy, so that the distance between the front pillar and the pillar garnish necessary for energy absorption can be minimized. As a result, the impact energy can be absorbed without narrowing a field of view.

In case the energy absorber is a lattice-like rib, the energy absorption characteristic can be readily varied by selecting the thicknesses, or quantity of the longitudinal ribs and/or the lateral ribs of the lattice. Further, being made of resin, it is easy to form. In addition, since there is a space extending longitudinally between the lattice-like rib and the abutting rib, a wire harness or the like can be disposed in this space, enabling the abutting rib to be used as holding means for the wire harness.

In case the longitudinal rib of the lattice-like rib extends up to the bottom or base of the flange, since it is possible to maintain the attitude and the position of the interior trim material substantially in the same state as before the impact force is applied and to deform the lattice-like rib substantially at the same position as before the impact force is applied, it is easy to adjust the energy absorption characteristic compared with a static deformation mode. Further, the longitudinal rib which bumps against the base of the flange buckles to start directly absorbing the impact force and propagates the impact force over the entire lattice-like rib to enable the energy absorption from the start when the impact force is applied. This means that an energy absorption characteristic of load vs. displacement with a rapid rising, enabling to approach an idealistic rectangular energy absorption characteristic. Further, the energy absorber has both functions to absorb impact energy and to maintain the attitude and the position of the interior trim material in the same state. Consequently, any new parts for maintaining the attitude and the position of the interior trim material in the same state are dispensed with.

Figure 8:
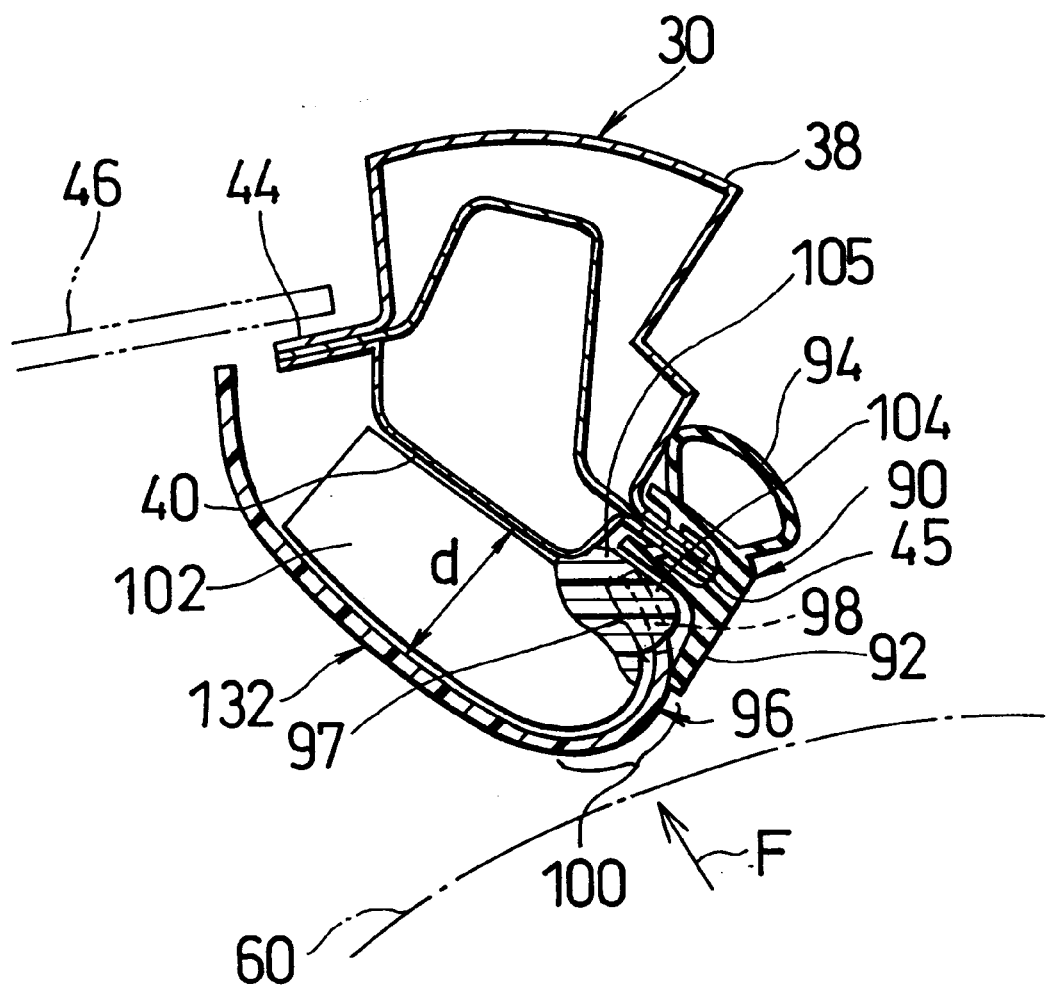
FIG. 8 is a horizontal sectional view showing still another embodiment of the impact energy absorbing structure of vehicle body upper portion relative to the present invention.

In the embodiment shown in FIG. 8, the structural member 30 is a front pillar including two flange joint portions 44, 45 where respective flanges of the outer panel 38 and the inner panel 40 are joined, and is formed to present a closed structure in its horizontal sectional shape. In the illustrated embodiment, an opening trim 90 is attached to one flange joint portion 45 of the front pillar 30, while a windshield glass 44 is attached to the other flange joint portion 44.

The opening trim 90 has integrally a lip 92, and a weatherstrip 94 of a side door (not shown). When the opening trim 90 is fitted into the flange joint portion 45 for attachment, the lip 92 covers the terminal portion of the pillar garnish to be described later.

Figure 9:
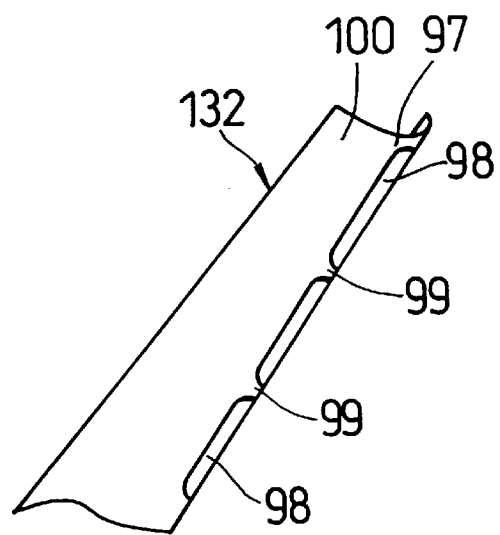
FIG. 9 is a perspective view showing a part of a pillar garnish.

The pillar garnish 32 is disposed with a space d necessary for energy absorption inwardly from the inner panel 40. The size of the space d is set within the aforementioned range. The pillar garnish 32 has a side portion 96 bent in the vicinity of the flange joint portion 45 with the opening trim 90 such that the horizontal sectional shape becomes convex inwardly of the passenger compartment. The side portion 96 has a notch 98 at a terminal portion 97 to be covered by the lip 92 of the opening trim 90. In the embodiment shown in FIG. 9, the terminal portion 97 of the pillar garnish 32 includes a plurality of bridge forming portions 99 at intervals in the longitudinal direction of the pillar, and the notches 98 are intermittently made with the bridge forming portion 99 left. Since the pillar garnish 32 is generally formed from a hard resin such as polyethylene, the bridge forming portion 99 can maintain its shape in itself. The notches 98 may have a configuration cut out from a bend 100 to an end face, or may have a configuration with a frame-like portion such as a window left therearound.

An energy absorber 102 is disposed in the space d. The energy absorber 102 includes an additional portion 104 extending toward the flange joint portion 45 having the opening trim 90, passing through the notches 98 of the pillar garnish. The additional portion 104, in case the energy absorber 102 is a hard urethane pad, may have a configuration with a part thereof projected, while in case the energy absorber is a lattice including a plurality of longitudinal ribs and a plurality of lateral ribs, the additional portion 104 is made to have some lateral ribs projected. In case the additional portion 104 is provided in the energy absorber 102, another additional portion 105 can be provided in a gap between the end face of the terminal portion 97 of the pillar garnish 32 and the inner panel 40. By this, a higher activity of the energy absorber 102 can be attained.

The impact energy absorbing structure of vehicle body upper portion shown in FIG. 8 functions as follows. The impact receiving body 60, when subjected to a predetermined or more load F directed outwardly of the passenger compartment, is brought into contact with a convex bend 100 of the side portion of the pillar garnish 32 and tends to press the terminal portion 97 against the pillar 30. The terminal portion 97, however, having the notches 98, cannot transmit the load. As a result, the load is transmitted from the bend 100 of the pillar garnish 32 to the energy absorber 102, thereby deforming the energy absorber 102, further deforming the additional portion 104 extending from the notches 98 toward the flange joint portion 45 and the additional portion 105 of the energy absorber. Thus, since the energy absorber 102 is deformed from the start when the load is applied, the characteristic $D_1$ with a rapid rising as shown in FIG. 10 is obtained. Thereafter, the energy absorber 102 deforms in the same direction as that of the load in a comparatively stable state. Thereby, a flat characteristic $D_2$ is obtained.

The opening trim shown in FIG. 8, being disposed in a mounting portion of the pillar where the side door is attached, is disposed in one flange joint portion in a front pillar and a rear pillar, while it is disposed in two flange joint portions in a center pillar. The impact energy absorbing structure of vehicle body upper portion shown in FIG. 8 can be provided in a portion corresponding to each opening trim.

The impact energy absorbing structure shown in FIG. 8 brings about the following effects:

Being able to deform the energy absorber from the time the impact receiving body is brought into contact with the bend of the pillar garnish and to deform the additional portion of the energy absorber passing through the notches and extending toward the flange joint portion, particularly the amount of impact energy absorption based on an initial load can be raised. In addition, the terminal portion of the pillar garnish has lost a load transmitting function due to the notches. Because of this, the amount of displacement of the energy absorber can be increased, thereby raising the amount of the impact energy absorption as a whole. Thus, an efficient energy absorption is enabled.

Since the terminal portion of the side portion of the pillar garnish is covered with the lip of the opening trim, the notches provided in the terminal portion and the additional portions of the energy absorber extending through the notches to the flange joint portion cannot be seen from the passenger compartment, and therefore, the appearance is not ruined.

In case the terminal portion of the pillar garnish includes a plurality of bridge forming portions at intervals in the longitudinal direction of the pillar and the notches are made intermittently with the bridge forming portion left, the bridge forming portion can be used as an abutting face for positioning the pillar garnish against the opening trim. By this, the accuracy in positioning of the pillar garnish can be improved.

What is claimed is:

1. An impact energy absorbing structure of a vehicle body upper portion of an automobile comprising:

a structural member having two flange joint portions, where two flanges respectively of an outer panel and an inner panel are overlapped and joined, and being formed so as to have a closed sectional structure;

an interior trim material inwardly defining a space for energy absorption between said interior trim material and said structural member;

an energy absorber disposed in said space;

means for assuring deformation of said energy absorber when said interior trim material deforms outwardly due to impact force;

wherein said means is formed by cooperation of said interior trim material and said energy absorber;

wherein said structural member is a pillar which includes an opening trim, having a lip, the opening trim being attached to at least one of said two flange joint portions;

wherein said interior trim material is a pillar garnish and has a side portion bent such that its horizontal sectional shape is convex inwardly in the vicinity of said flange joint portion where there is said opening trim, said side portion having at least one notch at a terminal portion thereof covered by said lip; and wherein said energy absorber has an additional portion passing through said notch to extend toward said flange joint portion where there is said opening trim.

2. An impact energy absorbing structure according to claim 1, wherein said terminal portion of said pillar garnish includes a plurality of bridge-forming portions at intervals in the longitudinal direction of said pillar, said notch being cut out intermittently so as to define the bridge-forming portions.

3. An impact energy absorbing structure of a vehicle body upper portion of an automobile comprising:

a structural member having a closed sectional structure and having two flange joint portions, each of said two flange joint portions being overlapped by and joined with a flange of an outer panel and an inner panel;

an interior trim material inwardly defining a space between said interior trim material and said structural member for energy absorption;

an energy absorber disposed in said space;

said energy absorber being a resin-made lattice-like rib including at least one longitudinal rib extending in the longitudinal direction of said structural member and a plurality of lateral ribs intersecting the longitudinal rib;

means for assuring deformation of said energy absorber when said interior trim material deforms outwardly due to an impact force, wherein said at least one longitudinal rib extends toward a corner of the inner panel near one of said two flange joint portions disposed near to a portion of the structural member where the impact force is applied, and wherein a point of said at least one longitudinal rib is close to the corner to be said means for assuring deformation.

4. An impact energy absorbing structure according to claim 3, wherein said structural member is a front pillar.

* * * * *